Nov. 14, 1967   J. E. MAGNUSON   3,352,442
MATERIAL-HANDLING VEHICLE
Filed Nov. 2, 1965                    2 Sheets-Sheet 1
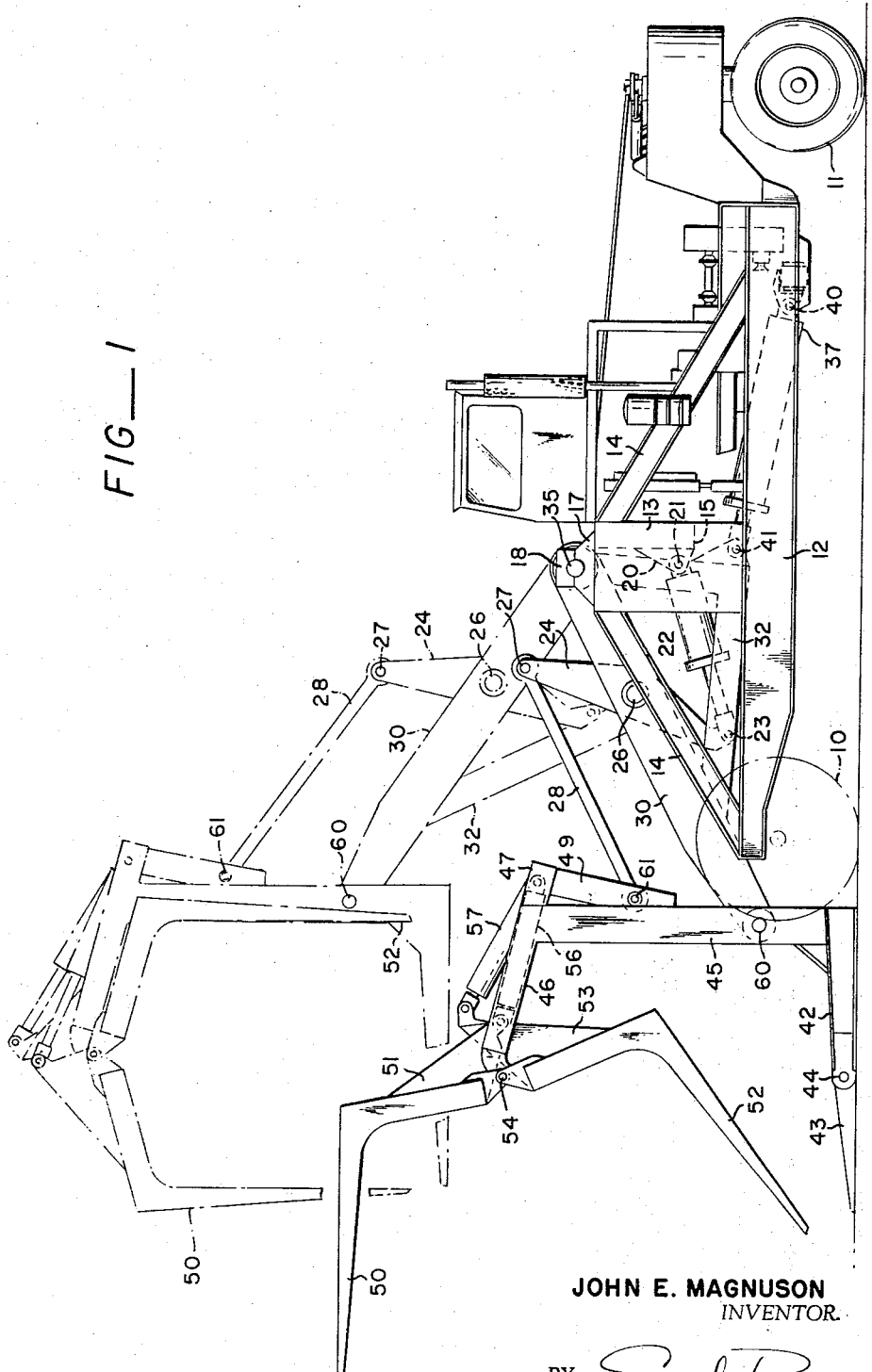
FIG__1
JOHN E. MAGNUSON
INVENTOR.
BY *Seed & Berry*
ATTORNEYS Nov. 14, 1967  J. E. MAGNUSON  3,352,442
MATERIAL-HANDLING VEHICLE
Filed Nov. 2, 1965  2 Sheets-Sheet 2
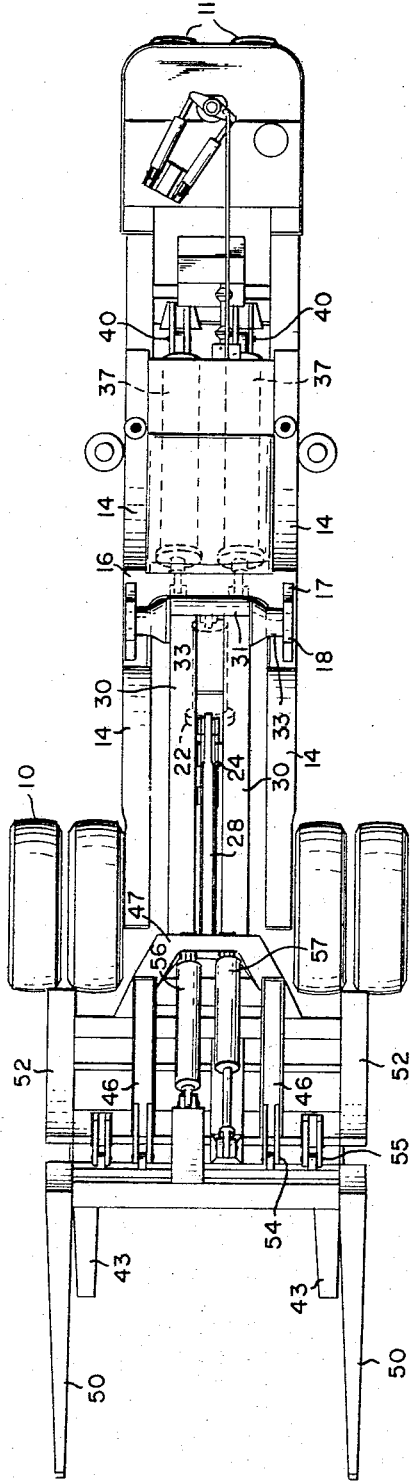
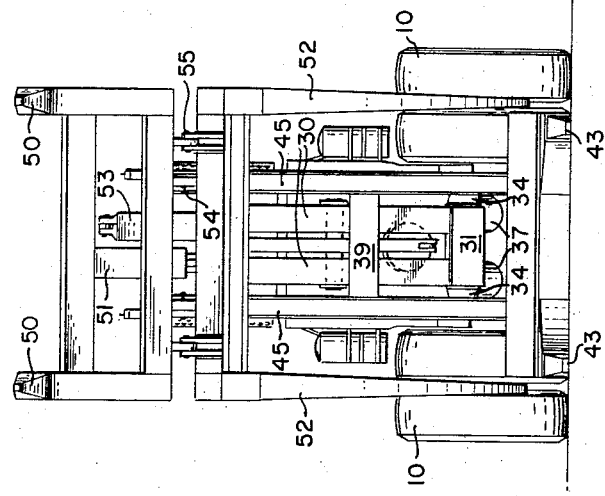
JOHN E. MAGNUSON
INVENTOR.
BY *Seed & Berry*
ATTORNEYS ём
United States Patent Office 3,352,442
Patented Nov. 14, 1967

3,352,442
MATERIAL-HANDLING VEHICLE
John E. Magnuson, Seattle, Wash., assignor to Pacific Car and Foundry Company, Renton, Wash., a corporation of Washington
Filed Nov. 2, 1965, Ser. No. 506,053
4 Claims. (Cl. 214—767)

This invention relates to a material-handling vehicle, one intended primarily for the handling of logs, and particularly a vehicle of the type in which the load is carried by a boom structure which includes parallel-motion arms in association with a walking-beam to enable a deck on which the load is carried to either be tilted up or down at will or be maintained, while the load is being raised or lowered, at any angularity relative to a given reference plane within the limits of said permitted tilt movement.

The invention purposes to provide a vehicle of this character designed for heavy-duty work and engineered so that it is capable of handling unusually heavy loads with ease and expedition.

A further and important object is to provide a material-handling vehicle of the described character employing hydraulic jacks to perform the swing motions of the load-carrying deck, and characterized in that the jacks are guarded in positions least vulnearable to the possibility of damage.

The invention has the yet further and important object of providing a material-handling vehicle incorporating two sets of claws supported for swing movement about a coinciding transverse horizontal axis, one set by a head structure which includes the deck and the other set from the head-supported set, one of such sets of claws facilitating a loading of the deck and also as a keeper for the load, the other set of claws performing a sweeper function to facilitate unloading of the deck.

These and other objects and advantages of the invention will appear and be understood in the course of the following description and claims, the invention consisting in the novel construction and in the adaptation and combination of parts hereinafter described and claimed.

In the accompanying drawings:

FIGURE 1 is a side elevational view illustrating a material-handling vehicle constructed in accordance with the preferred embodiment of the present invention. The material-handling head and the boom structure are shown in two positions, representing the one by full lines and the other by phantom lines.

FIG. 2 is a top plan view thereof; and

FIG. 3 is a front elevational view.

The material-handling structure of the present invention is shown as employing for its mobile mounting a 3-wheeled rubber-tired vehicle much the same in its general construction as the vehicle illustrated and described in my pending application for Letters Patent of the United States filed Apr. 29, 1964, Ser. No. 363,428, now Patent No. 3,221,909 and suffice it to here say that widely spaced wheels 10 at one end of a main frame serve as traction wheels, and a swivel-mounted pair of closely adjacent wheels 11 at the other end of the frame perform a steering function. The steerable end will be referred to as the rear end.

The vehicle main frame includes a pair of laterally spaced apart I-beam longitudinal principals 12. A respective one of two corresponding box-body standards 13 foots rigidly upon each of the frame principals at a point more or less central to their length, and these standards are trussed fore and aft by guesset stays 14. A fabricated cross-tie 15 extends between the standards, occupying a transverse vertical plane adjacent the rear edge of the standards and extending from the upper limit of the standards for approximately two-thirds of the height. The tie has a U-shaped plate 16 at the top, with its side arms extending forwardly in overlying relation to the standards. The base component 17 of a respective one of two co-axial split bearing blocks surmounts each of said side arms. The cap components of the blocks are denoted by 18.

A forked bracket 20 is made integral with the cross-tie and extends forwardly therefrom on the longitudinal median plane of the vehicle, being traversed by a transverse pivot pin 21 and serving as a mounting for the inner end of a double-acting hydraulic jack 22. Said pivot mounting for the jack is located well below the axial line of the bearing blocks, being here indicated as lying somewhat below the mid-height of the standards. The jack extends forwardly from such pivot mounting and at its outer end connects by a pin 23 with the lower end of an upright walking-beam 24. The walking-beam is carried by a boom, being fulcrumed at the latter's mid-length for rocker movement about a transverse horizontal axis by a pivot pin 26, and has its upper end pivoted by a pin 27 to the inner end of a link 28.

The boom is a fabricated structure comprised of two beams 30 occupying paralleling spaced positions at opposite sides of the walking-beam with the two ends integrally joined by a respective cross-member 31, and having below and integral with each beam a respective tongue 32 which is triangular when viewed from the side and occupies the longitudinal vertical plane of the beam. Cheek bosses 33 and 34 are provided at the inner and outer ends of the beams 30. A set of trunnion pins 35 extends laterally from the bosses 33 and receive a journal mounting between said base and cap components 17–18 of the split bearing blocks.

The boom is adapted to swing vertically through an approximate 60° arc which extends more or less equal distances above and below a horizontal plane including the trunnions 35. This swing movement is performed by a pair of companion double-acting hydraulic jacks 37. The jacks lie at opposite sides of the longitudinal median line of the vehicle, extending longitudinally in a more or less horizontal plane with their rear ends each connected by a respective pivot pin 40 to a forked mounting which is carried by a cross-member of the vehicle frame and with their front ends each connected by a respective pivot pin 41 to a bracket provided at the apical end of a related tongue 32.

The material-handling head for the vehicle has a material-supporting planar deck 42 which is prolonged forwardly by two pivoted fork-arms 43. The fork prolongations are free to tilt upwardly about their pivots 44 but are precluded from tilting downwardly beyond a normal position co-planar with the deck. Transversely spaced standards 45 rise from the rear end of the deck, and arms 46 extend forwardly in overhanging relation to the deck from the upper ends of the standards. The deck with its prolongations, the standards at the rear, and the arms overhead, give the head a general C-shape when viewed from the side, producing a maw or throat which is open to the front and to both sides. A yoke-like cross-member 47 connects the standards at their upper ends. Two paralleling spaced apart brace-arms 49 angle downwardly from the cross-arm of the yoke 47 to a cross-member 39 located at the approximate mid-height of the head standards.

Two levers of the first order are fulcrumed for vertical swing movement about a coinciding transverse horizontal axis, one to the ends of the arms 46 and the other to the first said lever. Each lever provides for its work arm a pair of transversely spaced apart angular tusks joined by a cross-member. This cross-member extends from the fulcrum to approximately the junction of the two sections which give to the work arm its angular shape. The power arm for each lever is comprised of a tongue, triangular in shape, extending as a web from the back face of the concerned cross-member. The tusks of one of the levers function primarily as keepers to retain a load on the deck, and may also be used to draw logs onto the deck. These tusks are denoted by 50 and the related power arm by 51. The tusks 52 of the other lever serve an unloading function, "kicking" the load from the deck. The power arm for the kicker tusks is denoted by 53. The keeper tusks admit to a 120° swing travel, and kicker tusks a 45° swing.

In FIG. 1 I have employed full lines to show the position occupied by the keeper tusks when they are raised to a fully open condition, and phantom lines to show the position occupied when the same are lowered to a load-retaining position. As regards the kicker tusks, full lines show the advanced position and phantom lines the retracter position. Vertical planes in which the keeper tusks and the kicker tusks swing coincide as between the two and lie immediately to the outside of the standards 45. This swing movement is performed by double-acting hydraulic jacks 56 and 57, each extending between the cross-arm of the yoke 45 and the related tongue which serves as the power arm for the concerned pair of tusk arms.

The outer end of the boom and the outer end of the link 28 each connect pivotally with the material-handling head. A pin 60 is received through center-bores of the cheek bosses 34 to provide the former connection. A pin 61 traversing the brace-arms 49 provides the latter connection. The geometry of the four pivot points 26, 27, 60 and 61 produce a pantograph assembly so that operation of the jack 22 will place the loading deck of the material-handling head in any desired position within the limits of a given range of tilt movement, and such position, in the absence of any interim operation of the jack 22, will be then maintained regardless of the vertical position into which the head is moved by swing motion of the boom in response to an operation of the jacks 37.

It is thought that the invention, and the manner of its operation, will have been clearly understood from the foregoing detailed description of my now-preferred illustrated embodiment.

What I claim is:

1. In combination with a vehicle main frame, a load handling head, a boom extending between the frame and the head with its inner end pivoted to the frame for vertical swing movement through an arc extending more or less equal distances above and below the horizontal plane occupied by said frame pivot and with its outer end pivoted to the head for vertical tilting movements of the head, the boom having a depending crank arm which when the boom is in its lowermost position occupies a transverse vertical plane approximately coinciding with a perpendicular dropped from the boom's frame pivot, a double-acting hydraulic jack pivoted by one end to the crank and by the other end to the frame for swinging the boom, an upright walking-beam fulcrumed to the boom for rocker movement about an axis paralleling said two boom pivots and located intermediate the same, pivoted links extending one forwardly from the upper end of the walking beam to the head and the other rearwardly from the lower end of the walking beam to the frame, one of said links comprising a double-acting hydraulic jack generally paralleling the boom and serving by contraction and extension to impart tilting movements to the head, the other link having a fixed length, the two pivots of said latter link together with the pivot at the related end of the boom and the fulcrum of the walking-beam being so related that a pantograph assembly is produced causing the head to maintain any tilt which is given thereto regardless of the swing movements to which the boom is subjected the frame providing transversely spaced apart longitudinal principals with a standard rising from each principal and gusset stays extending both forwardly and rearwardly between the standards and the frame principals, the boom occupying the space between the standards with its inner end journaled from the upper end of the latter to provide the frame pivot, said boom comprising two paralleling transversely spaced beams rigidly joined at the ends by cross-members and each stiffened by a respective triangular tongue made integral with the related beam and depending from the underside thereof in the longitudinal vertical plane of the beam, said tongues serving together as the crank arm for the boom, a set of two of the boom-swinging jacks being provided with each jack occupying substantially the same longitudinal vertical plane as the related tongue and extending rearwardly therefrom, said boom-swinging jacks being guarded at each side by the gusset stays, the walking-beam occupying the space between the boom-forming beams, the jack which tilts the head being the link which extends rearwardly to the frame from the lower end of the walking-beam, said head-tilting jack being guarded at each side by the triangular tongues which depend from the paralleling beams, the geometry of the complete structure being such that both the gussets and the tongue perform their guarding functions in substantially all positions in which the head may be placed.

2. In combination with a vehicle main frame, a load handling head, a boom extending between the frame and the head with its inner end pivoted to the frame for vertical swing movement through an arc extending more or less equal distances above and below the horizontal plane occupied by said frame pivot and with its outer end pivoted to the head for vertical tilting movements of the head, the boom having a depending crank arm which when the boom is in its lowermost position occupies a transverse vertical plane approximately coinciding with a perpendicular dropped from the boom's frame pivot, a double-acting hydraulic jack pivoted by one end to the crank and by the other end to the frame for swinging the boom, an upright walking-beam fulcrumed to the boom for rocker movement about an axis paralleling said two boom pivots and located intermediate the same, pivoted links extending one forwardly from the upper end of the walking beam to the head and the other rearwardly from the lower end of the walking beam to the frame, one of said links comprising a double-acting hydraulic jack generally paralleling the boom and serving by contraction and extension to impart tilting movements to the head, the other link having a fixed length, the two pivots of said latter link together with the pivot at the related end of the boom and the fulcrum of the walking-beam being so related that a pantograph assembly is produced causing the head to maintain any tilt which is given thereto regardless of the swing movements to which the boom is subjected, the head having a general C-shape when viewed from the side, said C-shape providing a deck section on which the handled load is carried with a back wall section rising from the rear end of the deck and an overhead section extending forwardly from the upper end of the back wall section in overhanging relation to the deck section, two arms pivotally mounted at the outer end of said overhead section for swing movement about a coinciding transverse horizontal axis one arm to draw the load onto the deck and hold the same thereon and the other arm to sweep the load off the deck, and independent double-acting hydraulic jacks for operating the arms in their swing movement.

3. Structure according to claim 2 characterized in that one of the two load-handling arms receives its mounting from a pair of transversely spaced apart brackets which project as nose prolongations from the overhead section of the head and the other of the two load-handling arms receivers its mounting from a pair of transversely spaced apart brackets formed rigid with the first said arm.

4. Structure according to claim 2 in which the load-handling arms are each comprised of a lever of the first order with the power-arm component to which the related jack is attached comprising a tongue which is triangular in shape when viewed from the side and extending as a web extension from the root portion of the other or work-arm component of the concerned lever.

References Cited

UNITED STATES PATENTS

| 2,744,642 | 5/1956 | Sewell et al. | 214—147 X |
| 3,001,654 | 9/1961 | Albert | 214—140 |
| 3,203,566 | 8/1965 | Kampert et al. | 214—147 |
| 3,221,909 | 12/1965 | Magnuson | 214—147 |
| 3,224,607 | 12/1965 | Brown | 214—776 |

HUGO O. SCHULZ, *Primary Examiner.*